United States Patent
Virani et al.

(10) Patent No.: US 12,511,357 B2
(45) Date of Patent: Dec. 30, 2025

(54) METHOD AND SYSTEM FOR PRIVACY-PRESERVING COMMUNICATION ON WIRELESS EDGE DEVICES

(71) Applicant: Cutting Chai Technologies Pvt. Ltd., Mumbai (IN)

(72) Inventors: Anand Virani, Mumbai (IN); Badal Shah, Mumbai (IN)

(73) Assignee: CUTTING CHAI TECHNOLOGIES PVT. LTD, Mumbai (IN)

( * ) Notice: Subject to any disclaimer, the term of this patent is extended or adjusted under 35 U.S.C. 154(b) by 240 days.

(21) Appl. No.: 18/182,602

(22) Filed: Mar. 13, 2023

(65) Prior Publication Data

US 2023/0289414 A1    Sep. 14, 2023

Related U.S. Application Data

(60) Provisional application No. 63/318,938, filed on Mar. 11, 2022.

(51) Int. Cl.
*G06F 21/31* (2013.01)
*H04L 67/306* (2022.01)
*H04W 4/02* (2018.01)

(52) U.S. Cl.
CPC .......... *G06F 21/316* (2013.01); *H04L 67/306* (2013.01); *H04W 4/025* (2013.01)

(58) Field of Classification Search
CPC ...... H04L 67/535; H04L 67/52; H04L 67/306
See application file for complete search history.

(56) References Cited

U.S. PATENT DOCUMENTS

| | | | | |
|---|---|---|---|---|
| 9,178,933 | B1* | 11/2015 | Soland | H04L 67/52 |
| 11,144,954 | B1* | 10/2021 | Xu | G07C 9/00 |
| 2009/0247193 | A1* | 10/2009 | Kalavade | H04L 67/53 |
| | | | | 455/456.3 |
| 2015/0006526 | A1* | 1/2015 | Duleba | G06F 16/29 |
| | | | | 707/728 |
| 2016/0253710 | A1* | 9/2016 | Publicover | H04W 4/21 |
| | | | | 705/14.66 |
| 2019/0147408 | A1* | 5/2019 | Renaud | G06Q 10/1095 |
| | | | | 705/5 |
| 2021/0201346 | A1* | 7/2021 | Dejardins | H04L 67/55 |
| 2021/0319478 | A1* | 10/2021 | Dejardins | G06T 19/006 |

* cited by examiner

*Primary Examiner* — Jonathan A Bui (57) ABSTRACT

Present disclosure provides a method and a system for privacy-preserving communication on wireless edge devices. The proposed method includes creating and maintaining user data (user activities) on the wireless edge devices. Further, the method includes running on-device mechanism on the user data to derive the daily routine of a user, and assigning a score to multiple activities (walking, running, climbing the stairs, descending the stairs etc.) in the daily routine. Further, the method includes creating and maintaining a profile of the user based on these activities. Further, the user profile is used by the system as a basis for targeted and contextual communication with the user in a manner that preserves user personally identifiable and sensitive information on the wireless edge device.

13 Claims, 5 Drawing Sheets

METHOD AND SYSTEM FOR PRIVACY-PRESERVING COMMUNICATION ON WIRELESS EDGE DEVICES

PRIORITY DETAILS

The present application is based on, and claims priority from a U.S. Application No. 63/318,938 filed on 11 Mar. 2022, the disclosure of which is hereby incorporated by reference herein.

FIELD

The embodiments herein generally relate to data privacy protection and more particularly related to a method and a system for privacy-preserving communication on wireless edge devices.

BACKGROUND

In general, devices such as smartphones capture user personal data such as the user name, phone number, address, location, places they visit, etc. Further, the personal user data is sent to cloud servers for storage and further processing to track user preferences and behaviour on a continuous basis (what they do, what they buy, what they eat, where they go etc.) for performing specific actions such as marketing products and services. The main issue associated with user data privacy is ignored in this scenario. As a result, in case of data breaches, mass user data gets leaked on public platforms which leads to loss of user privacy and personal data protection. The data breaches occur specifically at the cloud servers or servers which handle mass user data which are associated with user personal data.

For example, an advertising agency receives user data related to multiple users including user identity, user location, user preferred shopping sites, user payment option preference, etc. In case the user data is leaked then the multiple users identity, location may be used for illegal activities. Thus, it is desired to address the aforementioned disadvantages and shortcomings by providing a useful alternative.

SUMMARY

The present disclosure provides a method for providing data privacy-preserving communication by edge device. The method includes determining, by the edge device, at least one user activity of at least one user of a plurality of users of the edge device and determining, by the edge device, information associated with the at least one user activity based on the at least one user activity. The information associated with the at least one user activity is stored at the edge device. The method also includes identifying, by the edge device, at least one location of interest for the at least one user of the plurality of users based on the information associated with the at least one user activity, generating, by the edge device, a user profile for the at least one user comprising a user profile tag and a user profile score based on a routine of the at least one user and sending, by the edge device, the user profile along with an anonymized user ID corresponding to the at least one user to a cloud server. The routine of the at least one user is determined based on a movement of the at least one user in the at least one location of interest.

In an embodiment, the method includes receiving, by the cloud server, the user profile along with the anonymized user ID corresponding to the at least one user and determining, by the cloud server, contextual content to be provided to the at least one user; and sending, by the cloud server, the contextual content for the at least one user to the edge device associated with the anonymized user ID.

In an embodiment, the method includes receiving, by the edge device, the contextual content for the at least one user associated with the anonymized user ID generated at the edge device; and presenting, by the edge device, the contextual content on a display of the edge device.

In an embodiment, the method includes assigning, by the edge device, a location tag for the at least one location of interest for the at least one user of the plurality of users; and storing, by the edge device, the location associated with the at least one user activity and the at least one location of interest with the corresponding location tag in the user profile associated with the at least one user.

In an embodiment, generating, by the edge device, the user profile for the at least one user comprising the anonymized user identifier, the user profile tag and the user profile score based on the routine of the at least one user includes determining, by the edge device, a plurality of movement parameters of the at least one user based on a movement of the at least one user in the at least one location of interest and mapping, by the edge device, the plurality of movement parameters of the at least one user and the at least one user activity of the at least one user. Also, the method includes determining, by the edge device, the routine of the at least one user based on the mapping; and generating, by the edge device, the user profile for the at least one user comprising the anonymized user identifier, the user profile tag and the user profile score based on the routine of the at least one user.

In an embodiment, determining, by the edge device, the plurality of movement parameters of the at least one user based on the movement of the at least one user in the at least one location of interest includes determining, by the edge device, the movement of the at least one user in the at least one location of interest, stored in the edge device; determining, by the edge device, a frequency of movement of the at least one user and a recency of movement of the at least one user in the at least one location of interest and determining, by the edge device, the plurality of movement parameters of the at least one user based on the movement of the at least one user in the at least one location of interest, the frequency of movement of the at least one user and the recency of movement of the at least one user.

In an embodiment, the user profile tag and the user profile score is used for segmentation of a content stored at the cloud server associated with the anonymized user ID generated by the edge device, and to provide contextual communication between the edge device and the cloud server.

In an embodiment, the information associated with the at least one user activity comprises at least one of: the at least one user activity, a speed associated with the at least one user activity, a duration of the at least one user activity and a location associated with the at least one user activity of the at least one user of the plurality of users.

In an embodiment, the information associated with the at least one user activity is stored at the edge device and not shared to the cloud server and wherein the information associated with the at least one user activity is secured using at least one form of authentication mechanism.

In an embodiment, the user profile comprises a knowledge graph with actionable elements indicating a routine of the at least one user.

An edge device for providing secure communication. The edge device includes a memory, a processor, a communicator and a user profile controller, The user profile controller is configured to determine at least one user activity of at least one user of a plurality of users of the edge device and determine information associated with the at least one user activity based on the at least one user activity. The information associated with the at least one user activity is stored at the edge device. The user profile controller is configured to identify at least one location of interest for the at least one user of the plurality of users based on the information associated with the at least one user activity; generate a user profile for the at least one user comprising a user profile tag and a user profile score based on a routine of the at least one user and send the user profile along with an anonymized user ID corresponding to the at least one user to a cloud server. The routine of the at least one user is determined based on a movement of the at least one user in the at least one location of interest.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The present disclosure provides a method for providing secure communication by edge device. The method includes determining, by the edge device, at least one user activity of at least one user of a plurality of users of the edge device and determining, by the edge device, information associated with the at least one user activity based on the at least one user activity. The information associated with the at least one user activity is stored at the edge device. The method also includes identifying, by the edge device, at least one location of interest for the at least one user of the plurality of users based on the information associated with the at least one user activity, generating, by the edge device, a user profile for the at least one user comprising a user profile tag and a user profile score based on a routine of the at least one user and sending, by the edge device, the user profile along with an anonymized user ID corresponding to the at least one user to a cloud server. The routine of the at least one user is determined based on a movement of the at least one user in the at least one location of interest.

An edge device for providing secure communication. The edge device includes a memory, a processor, a communicator and a user profile controller, The user profile controller is configured to determine at least one user activity of at least one user of a plurality of users of the edge device and determine information associated with the at least one user activity based on the at least one user activity. The information associated with the at least one user activity is stored at the edge device. The user profile controller is configured to identify at least one location of interest for the at least one user of the plurality of users based on the information associated with the at least one user activity; generate a user profile for the at least one user comprising a user profile tag and a user profile score based on a routine of the at least one user and send the user profile along with an anonymized user ID corresponding to the at least one user to a cloud server. The routine of the at least one user is determined based on a movement of the at least one user in the at least one location of interest.

The present systems of communication that are being used commercially by Businesses today, possess the following major disadvantages:

1. Loss of User Privacy with their data.

Most Businesses fail to preserve privacy for data generated explicitly by users or generated autonomously by the user's use of their digital systems, by collecting, transmitting, and storing sensitive data (e.g., Bank account) and personal identification data (e.g., Social Security Number) on systems in the Cloud and further sharing this data with multiple third parties without the user's knowledge or control, for commercial gains.

This poses safety and financial risks to users when this data is misused.

2. Lack of User data protection and security.

Many Businesses also fail to protect user sensitive and identification data that are stored on their Cloud systems, from hackers and third parties, leading to data breaches that pose similar risks to the user as mentioned above.

Over 3,950 confirmed data breaches in 2020 impacted over 600 million users.

3. Non-personal (generic) User communication on Wireless Edge devices.

Most Businesses access, create and maintain basic, simplistic digital profiles and identities of users or their customers. These profiles are used by Cloud based systems for wirelessly communicating with potential or existing customers for the purpose of information or commerce related to products and services, on the user's wireless edge devices (e.g., Smartphones). The communication is non-personal and generic in nature that is perceived as spam by the user. For e.g., spam emails comprised 80% of all emails sent in September 2021.

4. High cost of computing for AMIL workloads.

Most Businesses rely on AI/ML technology and systems to analyze the massive amounts of data generated by users, for the purpose of creating profiles of these users. Profiling helps Businesses better understand the user's needs, interests, preferences and use of their products and services for improving customer service and experience across all user touch points.

Most of these systems run profiling AI/ML workloads in the Cloud (Network core) on large, complex systems incurring computing and connectivity costs that increase significantly as the users scale up to millions of users.

Unlike to the conventional methods and systems, the proposed method does not share the user data such as user location, user preferences, user account details, etc. Rather, in the proposed method the edge devices stores all the user data, attaches tags to the user data, adds user score to the user data and shares only user profile comprising an anonymized user ID, the user tags and the user scores only to the cloud server. The actual data associated with the user is maintained at the edge device itself and not shared with the cloud servers, which enables secure communication by saving the user data from any form of data breaches at the cloud servers.

In the proposed method the cloud server uses anonymized user ID for processing the data received from the edge devices and personal user data is never shared with the cloud server which ensures user data security. This anonymized user ID is generated by the edge device and shared with the cloud server.

The proposed method is used to reduce loss of user privacy with their data and lack of user data protection and security. Further, the proposed method is used to improve non-personal (generic) user communication on wireless edge devices. Furthermore, the proposed method reduces the high cost of computing for Artificial Intelligence/Machine Learning (AI/ML) models.

The term 'Tags' and 'parameters' are used interchangeably and in this embodiment and have the same meaning.

Referring now to the drawings, and more particularly to FIGS. 1 through 5, where similar reference characters denote corresponding features consistently throughout the figures, there are shown preferred embodiments.

Figure 1:
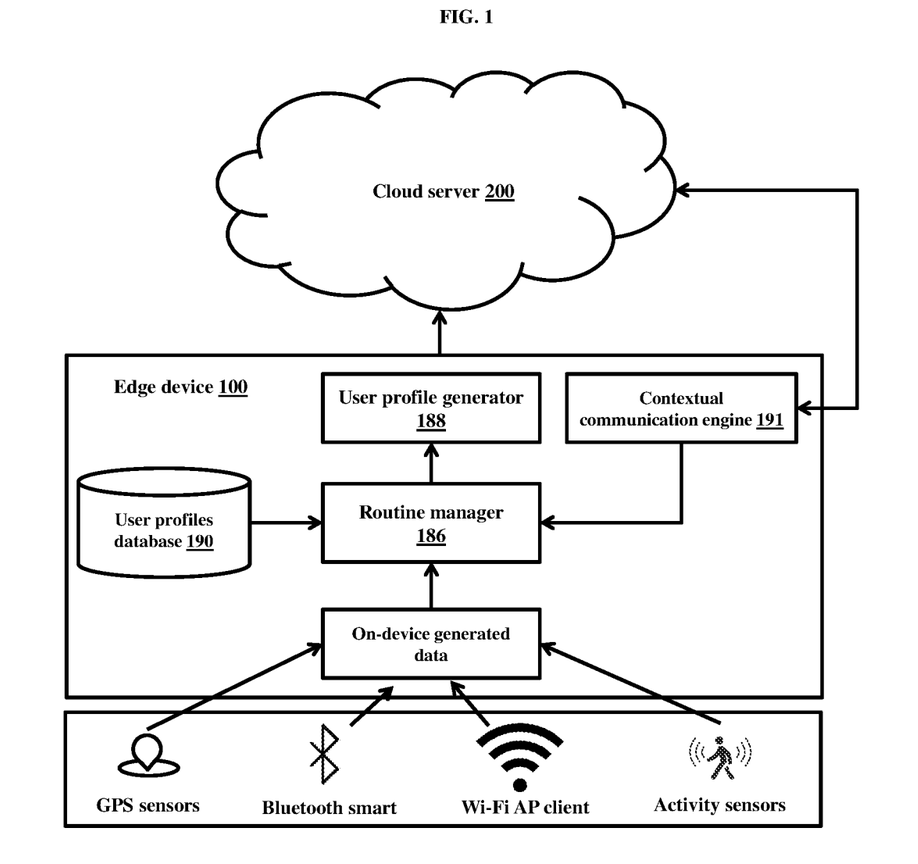
FIG. 1 illustrates an architecture of a system for privacy-preserving communication on wireless edge devices, according to the embodiments as disclosed herein.

FIG. 1 illustrates an architecture of a system for privacy-preserving communication on wireless edge devices, according to the embodiments as disclosed herein.

Referring to the FIG. 1, data created and maintained on the edge device (100) include, but are not limited to, sensor-activity data, location data, user presence data in terms of on-device proximity sensors (BLE and Wi-Fi) and contextual communication.

The sensor-activity data is created by collecting sensor data from sensors such as accelerometer, gyroscope, magnetometer, gravity sensor, step counter, linear acceleration sensor, rotation sensor, etc. and processing the collected sensor data to derive physical activity recognition and speed recognition. By the physical activity recognition and the speed recognition, a user will understand the state of the edge device (100) like idle, moving, walking, running, in automobiles and the speed for the same like walking speed, running, speed etc.

The sensor data of the accelerometer is used for acceleration force against each axis and gravity.

The sensor data of the Gyroscope is used to measure a rate of rotation.

The sensor data of the Magnetometer is used to measure direction, strength, or relative change of a magnetic field.

The sensor data of the gravity sensor is used to measure the force of gravity.

The sensor data of the step counter is used to count a number of steps that a user has moved.

The sensor data of the linear acceleration sensor is used to measure the user moving in the same direction.

The sensor data of the rotation sensor is used to detect a change in the direction of movement of the user.

Using the sensor data, the activity recognition and the speed recognition is done by the edge device (100) and accordingly the activities and the duration of the activities are derived by the edge device (100). Some of the examples for user activities like, Idle or not moving, walking, running, climbing the stairs, descending the stairs, moving in the same direction, change of direction, speed of movement (walking, cycling, jogging and running), number of steps, moving in automobile and so on.

Location data and point of interest data with different location tags is saved in the edge device (100) and based on movement of the user in those locations/points of interest, different parameters of the movement are collected by a GPS sensor like an entry time to the location/point of interest, an exit time to the location/point of interest, a duration spent at the location/point of interest along with the type of a location/point of interest. Examples of the type of location are shopping areas, restaurant and food areas, a gym, park and gardens, a parking area, metro stations, bus stations, railway stations, airports, corporate offices, school and colleges, temples, beauty salons and spas etc.

The user movement data in different locations, collected by the GPS sensor, is maintained on the edge device (100) and by using the other parameters like entry time, exit time and duration the retentiveness, a frequency and a recency of the movement of the user in these locations is calculated. The edge device (100) maps the location data with the activity data and creates a routine of the user based on the mapping. Further, the proposed mechanism maps profile parameters (which are the same as profile tags) and assigns the score to each profile parameter. The profile parameters of the user can be used for any level of segmentation and for targeted and contextual communication. Examples of the routine are given below.

Wake up: 6 AM
Cycling: 8 AM for 1 hour
Starting for Office: 9 AM
Travelling by Metro: 9:15 AM
Travel time in Metro: 30 minutes
Office reaching time: 10 Am
Starting from office to Home: 6:30 PM
Travelling by metro: 6:45 PM
Travel time in Metro: 30 minutes
Reach home: 7:30 PM
Walking: 9 PM for 30 minutes
Sleep: 10:30 PM Similar routine will be created for each user and will store on the edge device (100) (e.g., User's phone). Based on the routine, the edge device (100) will assign profile tags to the users and give a score 1-5 based on repetitiveness, recency and the activity score.

Cycling: 3
Gym going: 2
Corporate office: 3
Travel by Metro: 3
Travel by Car: 1
Health and wellbeing: 3

The only data that is synced to a cloud server (200) is the user profile tags and the score assigned to it along with anonymized user ID. This anonymized user ID is generated by the edge device (100) and shared with the cloud server (200). The data such as which user visited which location at what time and what is their routine remains private as this data is always maintained on the edge device (100) and never gets synced to the cloud server (200). Therefore, the cloud server (200) which may be a third part entity never has access to the user personal data and hence the user data security is maintained. The profile tags and assigned scores of the users can be used for any level of segmentation and for targeted and contextual communication.

Presence data is determined while the users are moving in different locations and dwelling there, based on the activity recognition like number of steps and speed of steps and movement. The on-device Wi-Fi and Bluetooth (BLE) sensors get activated and match with an existing on-device saved Wi-Fi service set identifier (SSID) and Bluetooth Identifier data to confirm precise presence of the user at a specific location (e.g. outside or indoor presence) like the metro station, the railway station, the airport, a corporate office, home, gym and yoga center, shopping center, the restaurants etc.

Software development kit (SDK) saves different SSIDs and Bluetooth Identifier data from the cloud in the on-device local database. The scanned data collected by the Wi-Fi and BLE sensors are matched with the data saved in the local DB to confirm the presence of the user at the location and accordingly. Based on the presence data, the mechanism will increase the score of the profile tags as follows—

Gym Workout: 3
Corporate office: 4
Travel by Metro: 4

Contextual communication is determined by the cloud server (200) for example using ML models (284). The cloud server (200) uses the anonymized user ID mapped with the profile tags along with the score using which multiple types of segmentation can be done to generate the contextual communication to user groups such as:

People who regularly go to gym
People who do cycling
People who do shopping once in a week
People who go to restaurants once in a month
People who have corporate profile
People who have a field job etc.

Another set of contextual communication can be generated based on real-time activity of the users mapped to time and location such as:

People who onboarded metro
People who are at the airport
People who are leaving for office or for home
People who are in a car
People who have just done cycling etc.

Cost-efficient computing for the AI/ML workloads on the edge device (100): the proposed method makes use of the AI/ML workloads to maintain and update the user's profile using multiple datasets such as user's characteristics data, context data, data on user response to contextual communication and profile data of real-world objects in proximity of the user. These workloads require computational resources with associated costs. Cost-efficient computing is achieved by offloading these workloads from the cloud server (200) (Network core) to run on the edge device (100) using computational resources across millions of devices. This has distinct cost advantages over existing technology/products that run profiling AI/ML workloads in the cloud server (200) (Network core) on centralized computing systems incurring costs that increase significantly as the users scale up to millions of users.

Furthermore, the proposed method uses below elements—

Accelerometer
Gyroscope
Magnetometers

The proposed invention introduces capabilities to any new or existing product, and application in multiple markets and industries where the privacy, protection, real-time and efficient use of user data is important. The applicability of the invention includes all markets where user data is being collected, used and shared between entities that are impacted by the rapidly changing Data privacy, protection and security regulations across the globe such as the California Consumer Privacy Act, California Online Privacy Protection Act, EU General Data Protection Regulation and more.

Some examples of markets and use cases are:
1. Industry 4.0—Ensure worker safety and security by alerting the worker or supervisor basis the user's real-time location and movement in unsafe areas or for safety events (e.g., Worker slips or falls, worker is still) or during safety hazards (e.g., Fire, Earthquake, Tornado).
2. Healthcare—Ensure patient safety and security by alerting the medical staff basis the patient's real-time location inside a hospital or assisted living facility for safety events (e.g., Patient slips or falls, patient is still).
3. Consumer Retail—Recommend personalized promotions and offers basis the user's real-time location and movement in certain types of locations.
4. Banking and Financial services—Recommend specific products (e.g., Loan, Insurance products) based on the user's shopping and lifestyle profile.
5. Media and Advertising—Show relevant content and ads based on the user's browsing behavior on related sites and user's movement in certain locations.
6. Metaverse Gaming and Entertainment—Show relevant content and ads in VR games basis the user's professional and travel profile.

Figure 2:
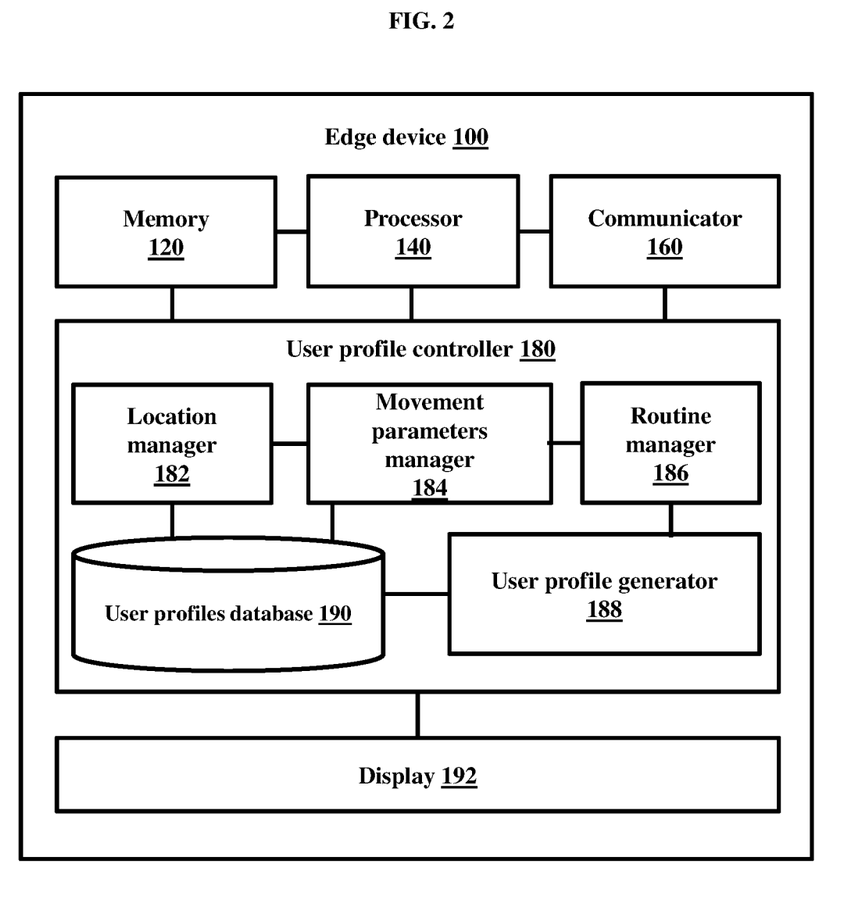
FIG. 2 is a block diagram of an edge device for providing secure communication, according to the embodiments as disclosed herein.

FIG. 2 is a block diagram of the edge device (100) for providing the secure communication, according to the embodiments as disclosed herein. Referring to the FIG. 2, the edge device (100) can be for example but not limited to a smartphone, a tablet, a laptop, a wearable device, a palmtop, an immersive device, etc. The edge device (100) includes a memory (120), a processor (140), a communicator (160) and a user profile controller (180). The user profile controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the user profile controller (180). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the wearable device (100) and with external devices via one or more networks.

In an embodiment, the user profile controller (180) includes location manager (182), a movement parameters manager (184), a routine manager (186), a user profile generator (188) and a user profiles database (190).

The location manager (182) is configured to assign a location tag for the at least one location of interest for the at least one user of the plurality of users; and store the location associated with the user activity and the location of interest with the corresponding location tag in the user profile associated with the user.

The movement parameters manager (184) is configured to determine the movement of the user in the location of interest, stored in the edge device (100) and determine a frequency of movement of the user and a recency of movement of the user in the at least one location of interest. Further, the movement parameters manager (184) is configured to determine the plurality of movement parameters of the user based on the movement of the user in the location of interest, the frequency of movement of the user and the recency of movement of the user.

The routine manager (186) is configured to map the plurality of movement parameters of the at least one user and the at least one user activity of the at least one user and determine the routine of the at least one user based on the mapping. The user profile generator (188) is then configured to generate the user profile for the user comprising the anonymized user identifier, the user profile tag and the user profile score based on the routine of the user. Therefore, the user profile generator (188) is configured to generate the anonymized user ID for each of the user profiles which ensures data privacy protection to the user data at the edge device (100). The information associated with the user activity includes the user activity, a speed associated with the user activity, a duration of the user activity and a location associated with the user activity of the user of the plurality of users. The user profile can for example include a knowledge graph with actionable elements indicating a routine of the user. For example, the routine manager (186) determines that the user travels in a train to office every day and also determines various train stations that the user passes by as part of user journey between user's home and user's office. Theses aspects are used in the user profile as part of the routine of the user.

The user profiles database (190) is configured to store the plurality of user profiles along with the anonymized user ID associated with the user profile. The access to the user profiles may be secured using any form of authentication mechanism. Each user profile includes for example but not limited to user data such as user location, user routine, user preferences, user tags associated with the user data, user data scores along with anonymized user IDs associated with user profile. Here, it is to be noted that the plurality of user profiles, an identity of the user associated with a specific profile, the location details associated with the user, etc. are stored in the edge device (200) itself and not shared to the cloud server (200), as it is done in existing methods and systems.

In an embodiment, the display (192) is configured to display the contextual content received from the cloud server (200). The display (192) is capable of receiving inputs and is made of one of liquid crystal display (LCD), light emitting diode (LED), organic light-emitting diode (OLED), etc.

Although the FIG. 2 shows various hardware components of the edge device (100) but it is to be understood that other embodiments are not limited thereon. In other embodiments, the edge device (100) may include less or a greater number of components. Further, the labels or names of the components are used only for illustrative purpose and does not limit the scope of the invention. One or more components can be combined together to perform same or substantially similar function.

Figure 3:
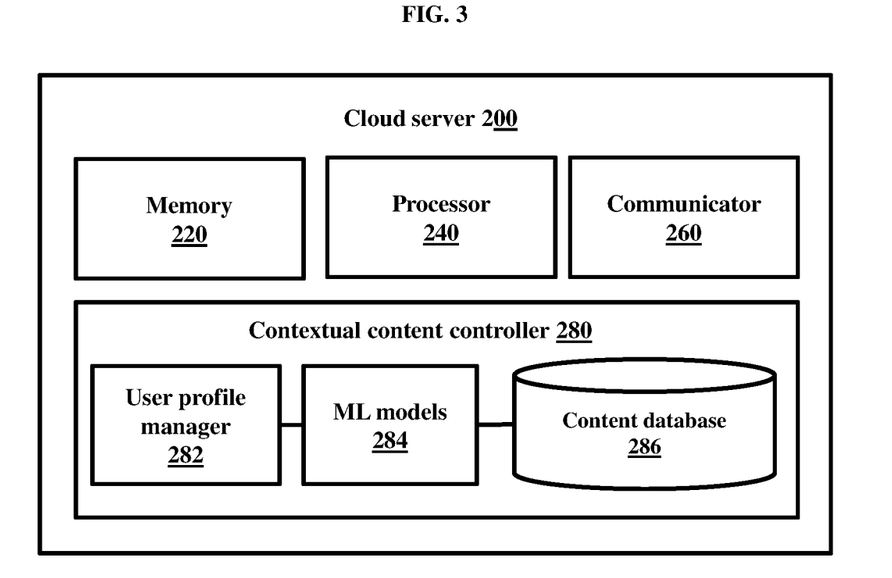
FIG. 3 is a block diagram of a cloud server for providing the secure communication, according to the embodiments as disclosed herein.

FIG. 3 is a block diagram of the cloud server (200) for providing the secure communication, according to the embodiments as disclosed herein. Referring to the FIG. 3, the cloud server (200) includes a memory (220), a processor (240), a communicator (260) and a contextual content controller (280). The contextual content controller (280) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory (220) is configured to store instructions to be executed by the processor (240). The memory (220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information. In certain examples, a non-transitory storage medium may store data that can, over time, change (e.g., in Random Access Memory (RAM) or cache).

The processor (240) communicates with the memory (220), the communicator (260) and the contextual content controller (280). The processor (240) is configured to execute instructions stored in the memory (220) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (260) includes an electronic circuit specific to a standard that enables wired or wireless communication. The communicator (260) is configured to communicate internally between internal hardware components of the edge device (100) and with external devices via one or more networks.

In an embodiment, the contextual content controller (280) includes a user profile manager (282), ML models (284) and a content database (286).

The user profile manager (282) is configured to receive user profile along with an anonymized user ID corresponding to the user and determine a match. The user profile along with the anonymized user ID is input to the ML models (284) stored at the cloud server (200). The ML models (284) are trained to provide content based on the routine of the user and a real-time activity of the user which is mapped to time and location of the user. Further, the ML models (284) are configured to determine contextual content to be provided to the user using the and send the determined contextual content for the user to the edge device (100).

The content database (286) is configured to store multiple content that can be sent to the edge device (100) based on the context of the user/user profile received. The user profile tag and the user profile score is used for segmentation of a content stored at the cloud server and provide contextual communication between the edge device and the cloud server (200).

At least one of the plurality of modules/components of the contextual content controller (280) may be implemented through an AI model. A function associated with the AI model may be performed through memory (220) and the processor (240). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 3 shows various hardware components of the cloud server (200) but it is to be understood that other embodiments are not limited thereon. In other embodiments, the cloud server (200) may include less or a greater number of components. Further, the labels or names of the components are used only for illustrative purpose and does not limit the scope of the invention. One or more components can be combined together to perform same or substantially similar function.

Figure 4:
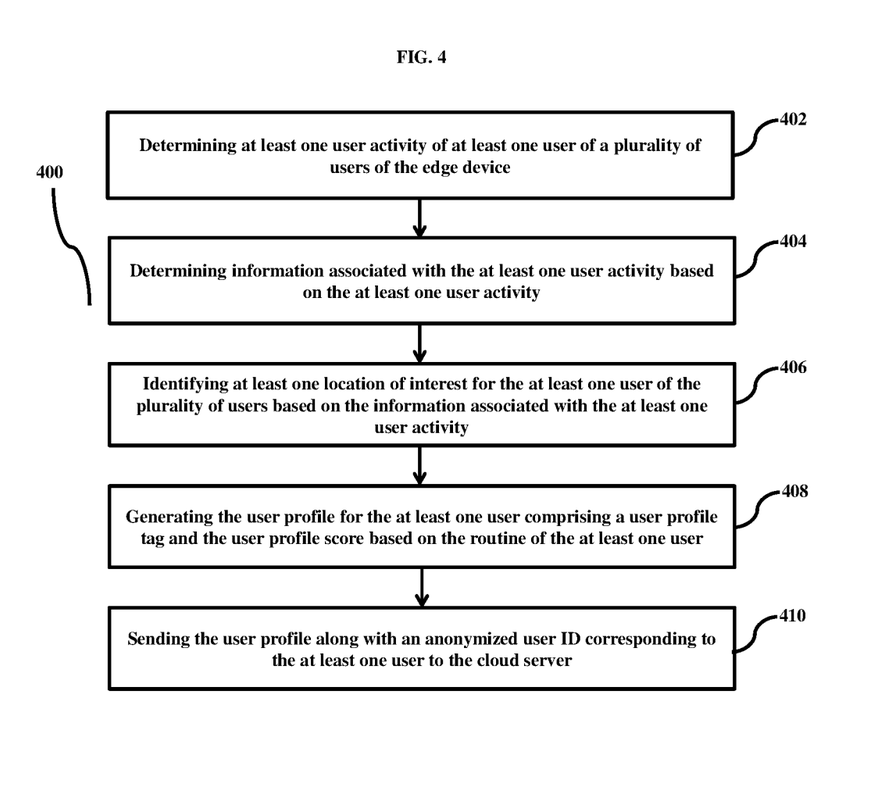
FIG. 4 is a flow chart illustrating a method for providing secure communication by the edge device, according to the embodiments as disclosed herein.

FIG. 4 is a flow chart (400) illustrating a method for providing secure communication by the edge device (100), according to the embodiments as disclosed herein.

Referring to the FIG. 4, at step 402, the method includes the edge device (100) determining the user activity of the user of the plurality of users of the edge device (100).

At step 404, the method includes the edge device (100) determining information associated with the user activity based on the user activity and at step 406, identifying the location of interest for the user of the plurality of users based on the information associated with the user activity.

At step 408, the method includes the edge device (100) generating the user profile for the user comprising the user profile tag and the user profile score based on the routine of the user and at step 410, sending the user profile along with the anonymized user ID corresponding to the user to the cloud server (200).

Figure 5:
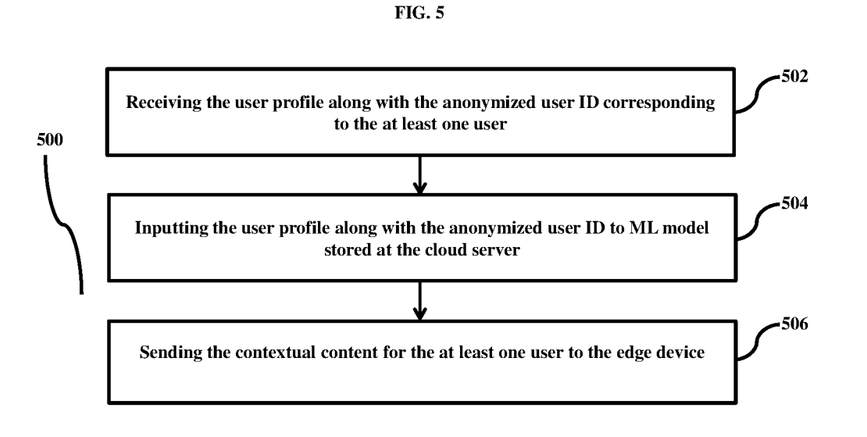
FIG. 5 is a flow chart illustrating a method for providing secure communication by the cloud server, according to the embodiments as disclosed herein.

FIG. 5 is a flow chart (500) illustrating a method for providing secure communication by the cloud server (200), according to the embodiments as disclosed herein. Referring to the FIG. 5, at step 502, the method includes the cloud server (200) receiving the user profile along with the anonymized user ID corresponding to the one user.

At step 504, the method includes the cloud server (200) determining the contextual content to be provided to the user and at step 506, sending the contextual content for the user to the edge device (100). The communication is created in the cloud server (200) and pushed to the contextual communication engine (191) of the edge device (100) for only the users whose profile tags match with the context. This communication is saved on the user profiles database (190) and is triggered by the mechanism based on the user activity recognition and the routine.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the claims as described herein.

We claim:

1. A method for providing privacy-preserving and secure communication by an edge device, wherein the method comprises:
　receiving, by the edge device, sensor data from on-device or external sensors comprising at least one of accelerometer, gyroscope, magnetometer, gravity sensor, step counter, linear acceleration sensor, and rotation sensor;
　determining, by the edge device, at least one user activity of at least one user of a plurality of users of the edge device based on the received sensor data, wherein the at least one user activity comprises at least one of Idle or not moving, walking, running, climbing stairs, descending the stairs, moving in same direction, change of direction, a number of steps taken by user, the at least one user is moving in automobile, and a speed of movement of walking, cycling, jogging and running;
　determining, by the edge device, information associated with the at least one user activity, wherein the information associated with the at least one user activity is stored at the edge device, wherein the information associated with the at least one user activity comprises a frequency associated with the at least one user activity, and a duration of the at least one user activity;
　identifying, by the edge device, at least one location of interest for the at least one user of the plurality of users based on the information associated with the at least one user activity;
　determining, by the edge device, movement parameters of the at least one user based on a combination of presence, duration, frequency and recency of movement of the at least one user in the at least one location of interest;
　determining, by the edge device, a routine of the at least one user by processing movement parameters of the at least one user;
　generating, by the edge device, a user profile for the at least one user based on the routine of the at least one user, wherein the user profile comprises a profile tag and a score assigned to each profile tag by the edge device, wherein the profile tag and the assigned score are used for segmentation of content stored at a cloud server and provide contextual communication between the edge device and the cloud server; and
　sending, by the edge device to a cloud server, the user profile along with an anonymized user ID generated and assigned by the edge device.

2. The method as claimed in claim 1, further comprises:
　receiving, by the cloud server, the profile tags and the score assigned to each profile tag, along with the anonymized user ID corresponding to the at least one user, wherein the score is assigned by the edge device based on repetitiveness, recency and the activity score;
　determining, by the cloud server, contextual content to be provided to the at least one user using AI/ML models based on the profile tag and the profile score associated with the at least one user; and
　sending, by the cloud server, the contextual content for users whose user profile tags match with the context content.

3. The method as claimed in claim 2, further comprises:
　receiving, by the edge device, the contextual content for the at least one user associated with the anonymized user ID generated at the edge device; and
　presenting, by the edge device, the contextual content received from the cloud server on a display of the edge device.

4. The method as claimed in claim 1, further comprises:
　assigning, by the edge device, a location tag for the at least one location of interest for the at least one user of the plurality of users; and
　storing, by the edge device, the location associated with the at least one user activity and the at least one location of interest with the corresponding location tag in the user profile associated with the at least one user.

5. The method as claimed in claim 1, wherein generating, by the edge device, the user profile for the at least one user comprising the anonymized user identifier, the profile tag and the user profile score based on the routine of the at least one user comprises:
　determining, by the edge device, a frequency of movement of the at least one user and a recency of movement of the at least one user in the at least one location of interest;
　determining, by the edge device, a plurality of movement parameters of the at least one user based on the movement of the at least one user in the at least one location of interest, the frequency of movement of the at least one user in the at least one location of interest and the recency of movement of the at least one user in the at least one location of interest;

mapping, by the edge device, the plurality of movement parameters of the at least one user and the at least one user activity of the at least one user;

determining, by the edge device, the routine of the at least one user based on the mapping; and generating, by the edge device, the user profile for the at least one user comprising the anonymized user identifier, the profile tag and the user profile score based on the routine of the at least one user.

6. The method as claimed in claim 1, wherein the information associated with the at least one user activity is stored at the edge device and not shared to the cloud server and wherein the information associated with the at least one user activity is secured using at least one form of authentication mechanism.

7. The method as claimed in claim 1, wherein the user profile comprises a knowledge graph with actionable elements indicating the routine of the at least one user.

8. An edge device for providing privacy-preserving and secure communication, wherein the edge device comprises:
a memory;
a processor coupled to the memory;
a communicator coupled to the memory and the processor; and
a user profile controller coupled to the memory, the processor and the communicator, wherein the user profile controller is configured to:
receive sensor data from sensor data from on-device or external sensors comprising at least one of accelerometer, gyroscope, magnetometer, gravity sensor, step counter, linear acceleration sensor, and rotation sensor;
determine at least one user activity of at least one user of a plurality of users of the edge device based on the received sensor data, based on the received sensor data, wherein the at least one user activity comprises at least one of Idle or not moving, walking, running, climbing stairs, descending the stairs, moving in same direction, change of direction, a number of steps taken by user, the at least one user is moving in automobile, and a speed of movement of walking, cycling, jogging and running;
determine information associated with the at least one user activity, wherein the information associated with the at least one user activity is stored at the edge device, wherein the information associated with the at least one user activity comprises a frequency associated with the at least one user activity, and a duration of the at least one user activity;
identify at least one location of interest for the at least one user of the plurality of users based on the information associated with the at least one user activity;
determine movement parameters of the at least one user based on a combination of presence, duration, frequency and recency of movement of the at least one user in the at least one location of interest
determine a routine of the at least one user by processing movement parameters of the at least one user;
generate a user profile for the at least one user based on the routine of the at least one user, wherein the user profile comprises a profile tag and a score assigned to each profile tag by the edge device, wherein the profile tag and the assigned score are used for segmentation of content stored at a cloud server and provide contextual communication between the edge device and the cloud server;
send the user profile along with an anonymized user ID associated with at least one user to a cloud server, wherein anonymized user ID is generated and assigned by the edge device; and
process the profile tag and the profile score mapped to the anonymized user ID for multiple levels of segmentation of content stored at the cloud server interfacing with an AI model to generate targeted contextual content for the user associated with the anonymized user ID.

9. The edge device as claimed in claim 8, wherein the user profile controller is further configured to:
receive contextual content for the at least one user from the cloud server associated with the anonymized user ID generated at the edge device; and
present the contextual content received from the cloud server on a display of the edge device.

10. The edge device as claimed in claim 8, wherein the user profile controller is further configured to:
assign a location tag for the at least one location of interest for the at least one user of the plurality of users; and
store the location associated with the at least one user activity and the at least one location of interest with the corresponding location tag in the user profile associated with the at least one user.

11. The edge device as edge device in claim 8, wherein the user profile controller is configured to generate the user profile for the at least one user comprising the anonymized user identifier, the profile tag and the user profile score based on the routine of the at least one user comprises:
determine a frequency of movement of the at least one user and a recency of movement of the at least one user in the at least one location of interest;
determine a plurality of movement parameters of the at least one user based on the movement of the at least one user in the at least one location of interest, the frequency of movement of the at least one user in the at least one location of interest and the recency of movement of the at least one user in the at least one location of interest;
map the plurality of movement parameters of the at least one user and the at least one user activity of the at least one user;
determine the routine of the at least one user based on the mapping; and
generate the user profile for the at least one user comprising the anonymized user identifier, the profile tag and the user profile score based on the routine of the at least one user.

12. The edge device as claimed in claim 8, wherein the information associated with the at least one user activity is stored at the edge device and not shared to the cloud server and wherein the information associated with the at least one user activity is secured using at least one form of authentication mechanism.

13. The edge device as claimed in claim 8, wherein the user profile comprises a knowledge graph with actionable elements indicating the routine of the at least one user.

* * * * *